May 10, 1932.  W. B. SCHULTE ET AL  1,858,026
BATTERY
Filed July 30, 1929
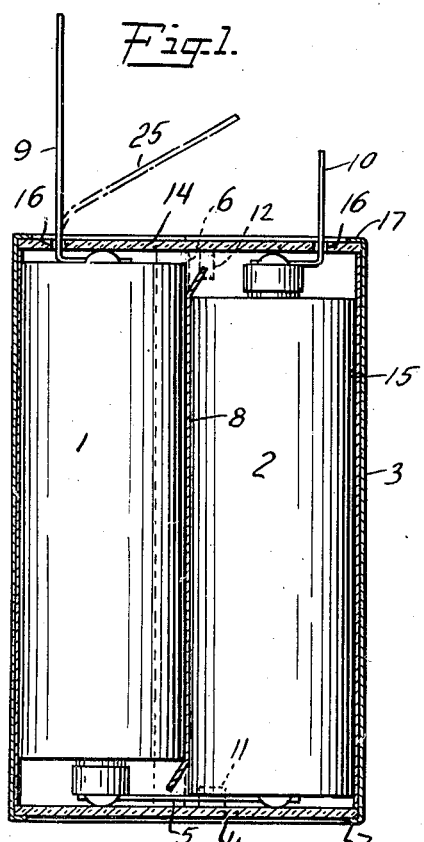
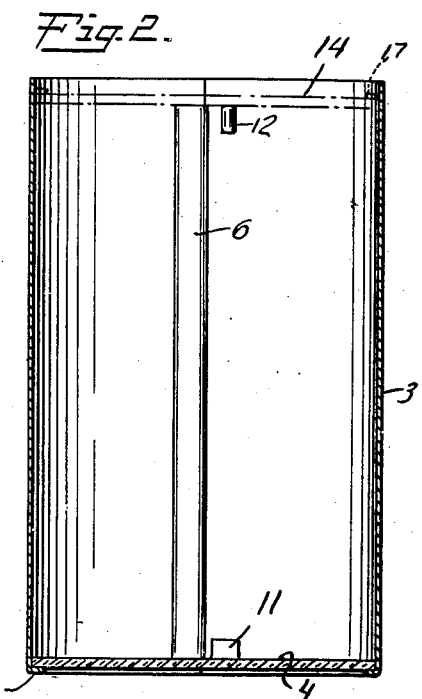
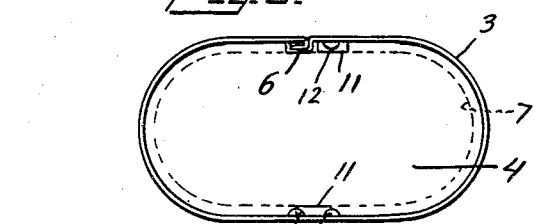
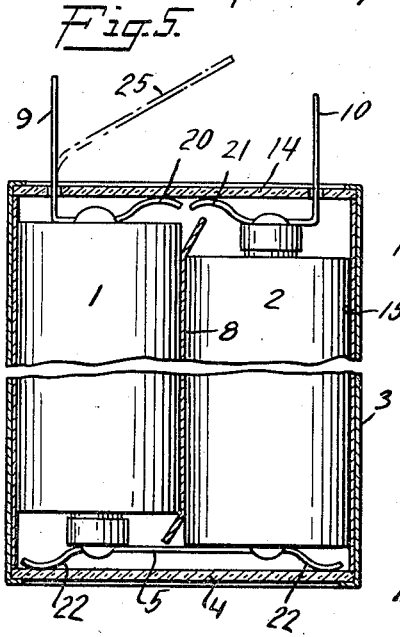
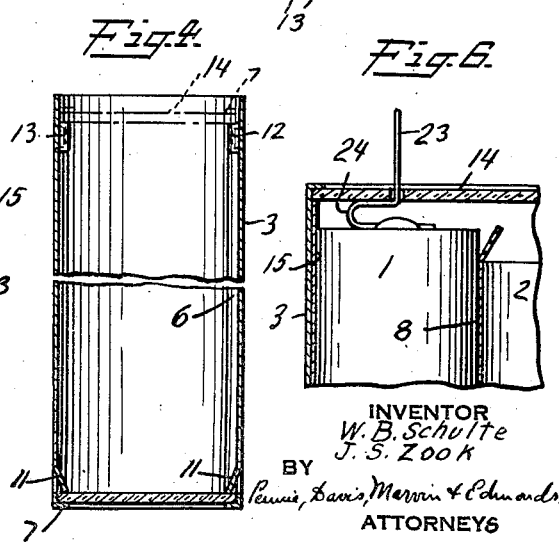
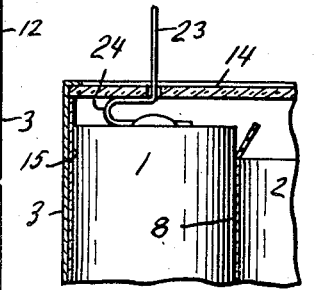
INVENTOR
W. B. Schulte
J. S. Zook
BY
Pennie, Davis, Marvin & Edmonds
ATTORNEYS Patented May 10, 1932

1,858,026

UNITED STATES PATENT OFFICE

WALTER B. SCHULTE AND JOHN S. ZOOK, OF MADISON, WISCONSIN, ASSIGNORS TO BURGESS BATTERY COMPANY, OF MADISON, WISCONSIN, A CORPORATION OF WISCONSIN

BATTERY

Application filed July 30, 1929. Serial No. 382,181.

This invention relates to an improved electric battery and specifically to a miniature dry cell battery encased in a metal container.

It is an object of this invention to provide a battery which is easy to assemble and cheap to make, which may be made very attractive in appearance and which is of rugged construction. Other objects will become apparent when the accompanying specification is read in conjunction with the drawings in which:

Fig. 1 is a partial cross-sectional elevation of one form of the battery;

Fig. 2 is a partial cross-sectional elevation of the container;

Fig. 3 is a top view of the container;

Fig. 4 is a cross-sectional view at right angles to Fig. 1;

Fig. 5 is a view similar to Fig. 1 showing another form of the battery; and

Fig. 6 is a detail view showing another method of positioning the top closure in the metal container.

In the form of the invention shown in Figs. 1 to 4, a battery unit comprising cells 1 and 2 is enclosed in an open-top metal container 3 having an insulating sheet bottom closure 4 preferably made of heavy paper. The battery unit is assembled prior to inserting it into the container. In the preferred form two or more cylindrical dry cells are positioned parallel to and laterally adjacent each other along their long axes, the top of one cell being adjacent the bottom of the other cell. For purposes of illustration two cells are shown. Three or more cells may be used and these may be arranged in other forms than the flat type shown. Prior to insertion of the cells in the container the positive pole of cell 1 and the bottom of the zinc can of cell 2 are connected to each other by conducting connecting strip 5. The cells may be held firmly in a jig while the strip is soldered or otherwise secured to them to connect them in series. Flat strip connectors or other suitable upwardly projecting leads 9 and 10 are soldered to the zinc bottom of the inverted cell 1 and the positive pole of cell 2, respectively. Instead of using the bottom closure 4 of paper the container may be provided with a metal bottom similar to the side walls, but in that case the metal bottom must be separated from the connecting strip 5 by a sheet of insulation.

The metal container is made by shaping a flat metal sheet, which preferably has been previously lithographed with appropriate decorative designs, into a flattened oval-shaped open end tube, as shown in Fig. 3, when two cells are used. The container may be provided with an interlocking crimp at seam 6 which is shown in detail in Fig. 3. The seam is preferably trimmed off slightly above the bottom and sligthly below the top of the can (see Fig. 2) to avoid interfering with the top and bottom closure sheets and to facilitate proper flanging of the edges. The bottom edge of the can is turned in or flanged substantially at right angles to the side walls to form a flange 7 and the insulating sheet bottom closure 4 rests on this ledge to form an open top metal container. After bottom closure sheet 4 has been inserted to close the bottom of the metal tube, the metal side wall is preferably punched inwardly as shown at 11 in Figs. 1, 2 and 4 of the drawings. As shown in Fig. 4 the metal is punched inwardly on both sides and at points where the inwardly projecting metal does not interfere with the insertion of the cells. When the bottom closure sheet 4 is inserted the inwardly projecting metal tabs spring outwardly to permit it to pass and it is then firmly retained by these tabs on the bottom flange 7. The projections are suitably spaced from the bottom of the cell to snugly retain the bottom closure sheet in position.

The height of the container above the bottom is substantially the same as the height of the battery unit to be encased therein. Adjacent the top of the container the side walls are preferably punched inwardly at diametrically opposite points as indicated at 12 and 13. The projections so formed form a support for a top closure member 14 of insulating material which is thus positioned in place at the top of the container at the proper height to permit the container to snugly receive the battery. These projections and seams 6 should also be located near the center of the flat portion of the side walls of the battery so as not to interfere with the insertion of the battery unit into the container. The seam 6 may be trimmed off at a point below the top edge of the can and used to form a ledge for the top closure in place of projection 12. If it is trimmed too low difficulties may be encountered during the flanging of the top of the container. After the battery is assembled in the container the top edge is flanged over the upper closure sheet as shown at 17 to retain the upper closure member in position.

Prior to insertion of the cells in the container a strip of insulating paper 8 is positioned between the two cells. A sheet 15 of insulating paper, or other insulating sheet, is inserted into can 3 to line the interior thereof. While we have illustrated a sheet lining the entire interior of the can, it is only necessary to insulate the container from the zinc cans that are at a different potential than the container. Instead of using an insulating sheet the interior of the container or the exterior of the zinc cans may be coated with an insulating varnish.

The top closure sheet 14 is provided with slits or apertures 16 through which the terminal leads 9 and 10 are adapted to project. In the form of the invention shown in Figs. 1 to 3 of the drawings proper positioning of the cells and the top and bottom closure sheets is obtained by means of the flanged edges of the container and the inwardly projecting tabs 11, 12 and 13. The various parts should be of such size as to form a snug fit and prevent the battery unit from sliding back and forth or "rattling" in the container. The sound deadening effect of the paper or other insulating sheet 15 effectually prevents rattling or sliding of the battery unit if the unit fits fairly snugly into the container. However, it is not always practical to obtain such ideal conditions in manufacture and when an insulating varnish is employed instead of the sheet 15 of paper, it is generally advisable to adopt other precautions to prevent the battery from sliding in the container. In Fig. 5 of the drawings we have shown a modification of the invention in which the leads 9 and 10 are extended beyond the point where they are connected to the poles of the battery as indicated at 20 and 21 and are bent upwardly to press against closure 14. These bent up portions act as take-up devices and prevent free movement of the battery unit in the container. The ends of the connecting strip 5 may be likewise extended as shown at 22 and bent downwardly to engage the bottom closure 4 to obtain the same results.

In the form of the invention shown in Fig. 6 of the drawings rattling, due to varying lengths of the cells, is overcome by employing a terminal strip 23 which is first soldered to the pole of the battery in the manner heretofore described and is then bent back on itself as at 24 forming a loop which serves as a spring seat for top closure 14. When either the form of the invention shown in Fig. 5 or Fig. 6 is employed with the spring pressure means to prevent rattling of the battery unit, the indentations 11, 12 and 13, or other similar positioning means for the top and bottom closure sheets, are unnecessary. In small pocket flash lamp batteries it is usual to bend terminal strip 9 as indicated in dotted lines at 25 in Figs. 1 and 5 of the drawings. This is one of the final manufacturing operations and can be done at any time after the battery unit is assembled in the case.

Although a battery of two cells has been shown and described, the method of construction herein described may be employed in the manufacture of batteries having three or more cells and of other shapes than that shown in the drawings.

We claim:

1. An electric battery comprising a unit of electrically connected, laterally adjacent dry cells, metallic strips in permanent electrical connection with the terminal poles of said unit and projecting upwardly therefrom, a sheet metal tube laterally encasing said unit and conforming to the lateral contour thereof, stiff insulating sheet covers over the top and bottom respectively of said unit and closing the ends of said metal tube, said metallic strips projecting freely through apertures in said top cover, the top and bottom edges of said metal tube being turned in substantially perpendicularly to the sides to form narrow ledges, said covers resting against said ledges, inward indentations in said tube immediately below said top cover and immediately above said bottom cover and maintaining said covers in place at the top and bottom respectively of said tube.

2. An electric battery comprising a unit of electrically connected, laterally adjacent dry cells, a sheet metal tube laterally encasing said unit and conforming to the contour thereof, stiff insulating sheets covering the top and bottom respectively of said unit and closing the ends of said tube, resilient metallic strips in electrical connection with the terminal poles of said unit and projecting upwardly through apertures in said top closure, the top and bottom edges of said metal tube being turned in substantially perpendicularly to the sides to form narrow ledges, said tube having an internal longitudinal seam, said seam being removed from the ends of said tube to points immediately above said bottom closure and below said top closure, means comprising the ends of said beams for holding said covers in place against said ledges at the top and bottom of said tube.

3. An electric battery comprising a unit of electrically connected dry cells, an open-top metal container, and an insulating sheet closure held resiliently in position at the top of said container by the terminal leads of said unit passing therethrough.

4. An electric battery comprising a unit of electrically connected dry cells, an open-top metal container, an insulating sheet closure held resiliently in position at the top of said container by the terminal leads of said unit passing therethrough, and means for holding said battery unit in position in said container.

5. An electric battery comprising a unit of electrically connected dry cells, a sheet metal tube laterally encasing said unit and conforming to the lateral contour thereof, inturned ledges at the ends of said tube, stiff insulating sheet closures held resiliently against said ledges by the respective ends of said unit.

6. An electric battery comprising a unit of electrically connected dry cells, a sheet metal tube laterally encasing said unit and conforming to the lateral contour thereof, said tube having an internal longitudinal seam, inturned ledges at the ends of said tube, stiff insulating sheet closures held against said ledges by the respective ends of said tube, said seam being removed at the ends of said tube a distance at least equal to the width of said ledges.

7. An electric battery comprising a unit of electrically connected dry cells, resilient metallic strips in electrical connection with the terminal poles of said unit and projecting upwardly therefrom, an open top metal container encasing said unit, a ledge at the top edge of said container, a stiff insulating sheet closure at the top of said container, and strips passing through openings in said closure, at least one of said strips being bent to form a support for resiliently holding said closure against said ledge.

In testimony whereof we affix our signatures.

WALTER B. SCHULTE.
JOHN S. ZOOK.